(12) United States Patent
Yun

(10) Patent No.: US 12,227,148 B2
(45) Date of Patent: Feb. 18, 2025

(54) MULTI-LEVER LIFTING DEVICE FOR VEHICLE WITH IMPROVED EFFICIENCY

(71) Applicant: Nam Ho Yun, Mokpo-si (KR)

(72) Inventor: Nam Ho Yun, Mokpo-si (KR)

( * ) Notice: Subject to any disclaimer, the term of this patent is extended or adjusted under 35 U.S.C. 154(b) by 188 days.

(21) Appl. No.: 18/110,546

(22) Filed: Feb. 16, 2023

(65) Prior Publication Data

US 2023/0264634 A1 Aug. 24, 2023

(30) Foreign Application Priority Data

Feb. 21, 2022 (KR) .................. 10-2022-0022588

(51) Int. Cl.
*B60R 9/042* (2006.01)
*B60R 9/045* (2006.01)

(52) U.S. Cl.
CPC ............. *B60R 9/042* (2013.01); *B60R 9/045* (2013.01)

(58) Field of Classification Search
CPC ............................... B60R 9/042; B60R 9/045
USPC ................................................ 224/310
See application file for complete search history.

(56) References Cited

U.S. PATENT DOCUMENTS

| | | | | |
|---|---|---|---|---|
| 4,439,086 A * | 3/1984 | Thede | ............ | B60R 9/08 224/310 |
| 5,104,280 A * | 4/1992 | Ziaylek | ............ | B60R 9/0423 280/4 |
| 5,884,824 A * | 3/1999 | Spring, Jr. | ............ | B60R 9/042 224/325 |
| 6,092,972 A * | 7/2000 | Levi | ............ | B60R 9/0423 224/310 |
| 6,427,889 B1 * | 8/2002 | Levi | ............ | B60R 9/0423 224/310 |
| 6,764,268 B2 * | 7/2004 | Levi | ............ | B60R 9/0423 224/310 |
| 2007/0175936 A1 * | 8/2007 | Goyanko | ............ | B60R 9/042 224/309 |
| 2014/0169918 A1 * | 6/2014 | Buller | ............ | B60P 1/486 414/462 |
| 2015/0069101 A1 * | 3/2015 | Presley | ............ | B60R 9/042 224/310 |
| 2017/0120833 A1 * | 5/2017 | Rudnicki | ............ | B60R 9/042 |
| 2017/0341590 A1 * | 11/2017 | McLauchlan | ............ | B60R 9/042 |
| 2019/0248295 A1 * | 8/2019 | Müller | ............ | B60R 9/0423 |
| 2020/0180515 A1 * | 6/2020 | Dimmen | ............ | A47B 88/45 |
| 2020/0247326 A1 * | 8/2020 | Paunov | ............ | B60R 9/045 |
| 2022/0355741 A1 * | 11/2022 | Yun | ............ | B60R 9/045 |

* cited by examiner

*Primary Examiner* — Peter N Helvey
(74) *Attorney, Agent, or Firm* — Heedong Chae; Lucem, PC

(57) ABSTRACT

The present invention relates to a multi-lever lifting device for a vehicle, which is a lifting device mounted on a roof or a cargo loading part of the vehicle so that a cargo may be easily loaded on the roof or the cargo loading part. More particularly, the present invention relates to a lifting device including a lower frame, a multi-lever including a first lever, a second lever, and a third lever, and an upper frame on which a cargo is loaded, and capable of lowering an operation height of the lifting device and reducing a driving torque that is required. According to the present invention, the second lever, the third lever, and the upper frame are located under the first lever during a rotation operation process, so that a height restriction is reduced, and a less acting torque is required.

7 Claims, 7 Drawing Sheets

MULTI-LEVER LIFTING DEVICE FOR VEHICLE WITH IMPROVED EFFICIENCY

CROSS-REFERENCE TO RELATED APPLICATIONS

This application claims the priority of Korean Patent Application No. 10-2022-0022588 filed on Feb. 21, 2022, in the Korean Intellectual Property Office, the disclosure of which is incorporated herein by reference.

BACKGROUND OF THE INVENTION

1. Field of the Invention

The present invention relates to a multi-lever lifting device for a vehicle, which is a lifting device mounted on a roof or a cargo loading part of the vehicle so that a cargo may be easily loaded on the roof or the cargo loading part.

More particularly, the present invention relates to a lifting device including a lower frame, a multi-lever including a first lever, a second lever, and a third lever, and an upper frame on which a cargo is loaded, and capable of lowering an operation height of the lifting device and reducing a driving torque that is required.

2. Description of the Related Art

The present invention relates to a multi-lever lifting device for a vehicle, in which a multi-lever may be unfolded at a roof position of the vehicle to allow a position of the multi-lever to be changed to a loading position on a lateral side or a rear side of the vehicle, so that a cargo may be easily loaded to the roof position of the vehicle.

Such a multi-lever lifting device is publicly known by the technical idea of Korean Patent Application No. 10-2019-0075679 filed and registered by the applicant. According to the invention of the related art, a heavy cargo may be mounted on a roof of a vehicle through appropriate lifting/lowering and rotating actions between the roof of the vehicle and a loading position on the ground.

The inventor of the present invention found that a lifting device having a smaller torque and a lower operation height than the invention of the related art is possible while operating the invention of the related art.

The inventor of the present invention has devised a multi-lever lifting device having a novel lever structure described above.

DOCUMENTS OF RELATED ART

Patent Documents

Invention of Related Art: Korean Patent No. 10-2136663 (registered on Jul. 16, 2020)

SUMMARY OF THE INVENTION

An object of the present invention is to provide a multi-lever lifting device installed in a vehicle, capable of operating with a relatively small torque at a relatively low lifting height.

To achieve the technical object described above, according to the present invention, a multi-lever lifting device includes the following technical solution. In other words, multi-lever lifting device includes:

a lower frame (100) fixed to a roof of the vehicle, and provided at a rear end thereof with a fixed shaft (110);

an upper frame (200) having a size corresponding to the lower frame, and provided to cover the lower frame at a roof position;

a multi-lever folded at the roof position and deployed at a loading/unloading position, and including a first lever (300) provided between the lower frame (100) and the upper frame (200), seated on the lower frame (100), and configured to rotate about the fixed shaft (110), a second lever (400) having a rear end hinge-coupled to a front end of the first lever (300) by a first rotation shaft (330), and seated on the lower frame (100) in an opposite direction to the first lever, and a third lever (500) having a rear end hinge-coupled to a front end of the second lever (400) by a second rotation shaft (430), having a front end provided with the upper frame, and seated on the lower frame (100);

an outer rotation shaft (340) having a concentric shape, and configured to rotate independently about the first rotation shaft (330), wherein the outer rotation shaft (340) is integrally coupled to the second lever so as to rotate, a first power transmission device (320) for connecting the fixed shaft (110) to the first rotation shaft (330) and connecting the fixed shaft (110) to the outer rotation shaft (340) is provided, a second power transmission device (420) is provided between the first rotation shaft (330) and the second rotation shaft (430), and the second rotation shaft is integrally coupled to the third lever so as to rotate.

According to the present invention, the multi-lever lifting device may include a horizontal movement device and a horizontal rotation device, which enable a horizontal movement and a horizontal rotation of the upper frame, respectively, in order to prevent an interference between the upper frame and the second lever during an operation.

According to the present invention, a multi-lever member, that is, the first lever (300), the second lever (400), and the third lever (500) seated on the lower frame may be sequentially operated by the rotation shafts (330, 430), the second lever (400) may be rotatably connected to the front end of the first lever (300) while being arranged in the opposite direction to the first lever (300), and the third lever (500) may be rotatably connected to the front end of the second lever (400) while being arranged in the same direction as the second lever (400), so that a height of the upper frame (200) provided on the third lever (500) can be significantly lowered, and thus a driving force that is required can be reduced.

According to the present invention, as the first lever (300) rotates to a rear side of the vehicle, the second lever (400) may operate at a lower position than the first lever (300), and the third lever (500) and the upper frame (200) may also be maintained at lower positions than the first lever (300), so that the second lever (400), the third lever (500), and the upper frame (200) can be prevented from being lifted high, and the present invention can be used even in an underground parking lot having a height that is not high.

DETAILED DESCRIPTION OF THE INVENTION

Figure 1A:
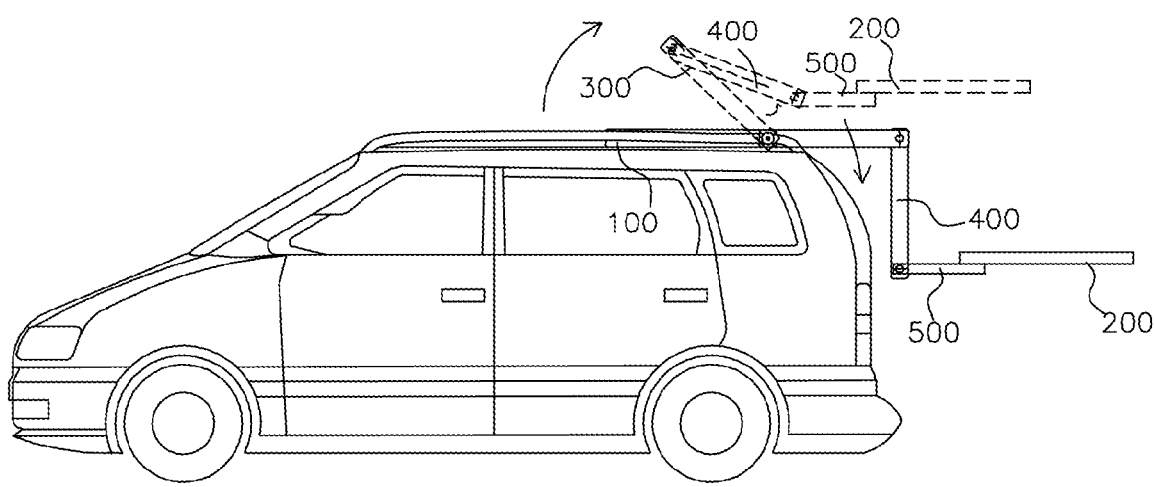
FIGS. 1A and 1B are conceptual diagrams showing an operation of a multi-lever according to one embodiment of the present invention.
Figure 1B:
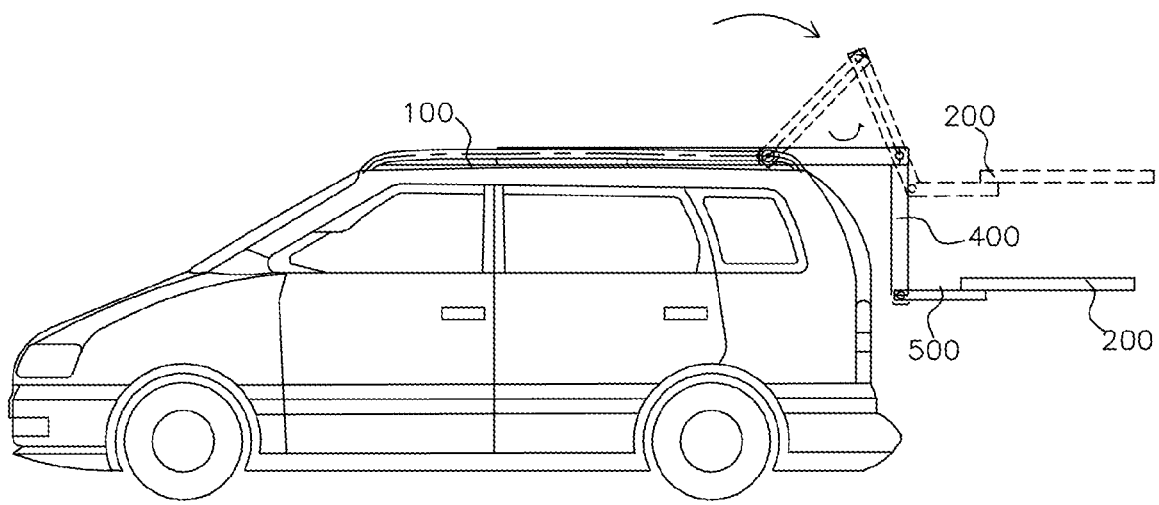

Referring to FIGS. 1A and 1B, according to the present invention, a multi-lever may be interposed between a lower frame 100 and an upper frame 200, so that, as the multi-lever is unfolded, the upper frame on which a cargo may be loaded may move from a loading position of a vehicle to a ground position.

Unlike the related art, according to one embodiment of the present invention shown in FIGS. 1A and 1B, as a first lever 300 rotates to a rear side of the vehicle, a second lever 400 may operate at a lower position than the first lever 300. In addition, a third lever 500 and the upper frame 200 may also be maintained at lower positions than the first lever 300. Therefore, the second lever 400, the third lever 500, and the upper frame 200 may be prevented from being lifted high, and the present invention may be used even in an underground parking lot having a height that is not high.

In detail, according to the present invention, a multi-lever lifting device for a vehicle may include:

- a lower frame 100 fixedly mounted to the vehicle, and provided at a rear end thereof with a fixed shaft 110;
- an upper frame 200 having a size corresponding to the lower frame, and provided to cover the lower frame at a roof position;
- a multi-lever folded at the roof position and deployed at a loading/unloading position, and including a first lever 300 provided between the lower frame 100 and the upper frame 200, seated on the lower frame 100, and configured to rotate about the fixed shaft 110, a second lever 400 having a rear end hinge-coupled to a front end of the first lever 300 by a first rotation shaft 330, and seated on the lower frame 100 in an opposite direction to the first lever, and a third lever 500 having a rear end hinge-coupled to a front end of the second lever 400 by a second rotation shaft 430, having a front end provided with the upper frame, and seated on the lower frame 100;
- an outer rotation shaft 340 having a concentric shape, and configured to rotate independently about the first rotation shaft 330, wherein the outer rotation shaft 340 is integrally coupled to the second lever so as to rotate,
- a first power transmission device 320 for connecting the fixed shaft 110 to the first rotation shaft 330 and connecting the fixed shaft 110 to the outer rotation shaft 340 is provided,
- a second power transmission device 420 is provided between the first rotation shaft 330 and the second rotation shaft 430, and the second rotation shaft 430 is integrally coupled to the third lever 500 so as to rotate.

Figure 2:
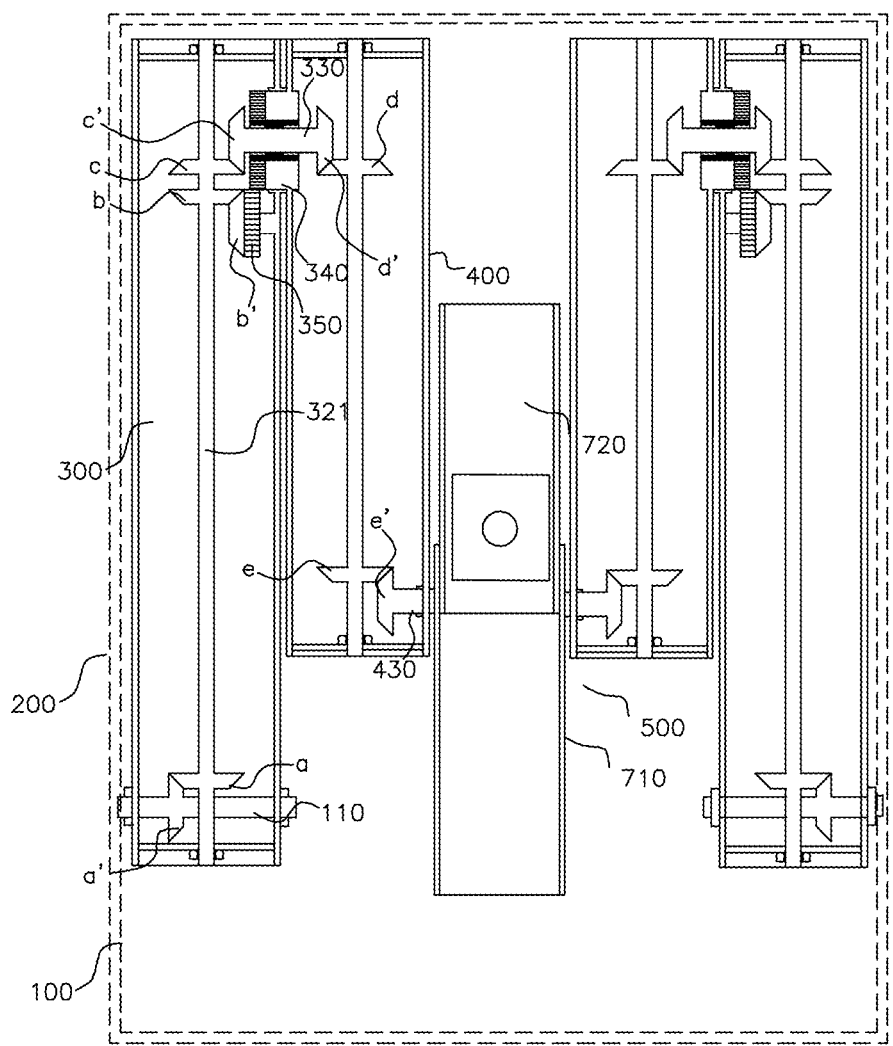
FIG. 2 is a view showing an arrangement of the multi-lever according to one embodiment of the present invention.

In other words, according to the present invention, the multi-lever disposed on the lower frame 100 may have a position as in FIG. 2. When the multi-lever of FIG. 2 moves from the roof position to the ground position, the upper frame 200 may interfere with the second lever 400. In order to prevent such an interference, before a rotation operation of the first lever 300 is performed, the upper frame 200 has to be horizontally moved to the rear side by a predetermined interval with respect to the third lever 500 and rotated horizontally.

In addition, in some cases, a lifting/lowering operation for lifting the upper frame upward with respect to the lower frame 100 may be required before the horizontal movement operation and the horizontal rotation operation. In other words, the upper frame 200 may have the same shape as the lower frame 100 with a slightly larger size than the lower frame 100, so that the upper frame 200 may cover the entire lower frame 100. In this case, the upper frame 200 has to be horizontally moved and horizontally rotated while being vertically lifted with respect to the lower frame 100.

Figure 3:
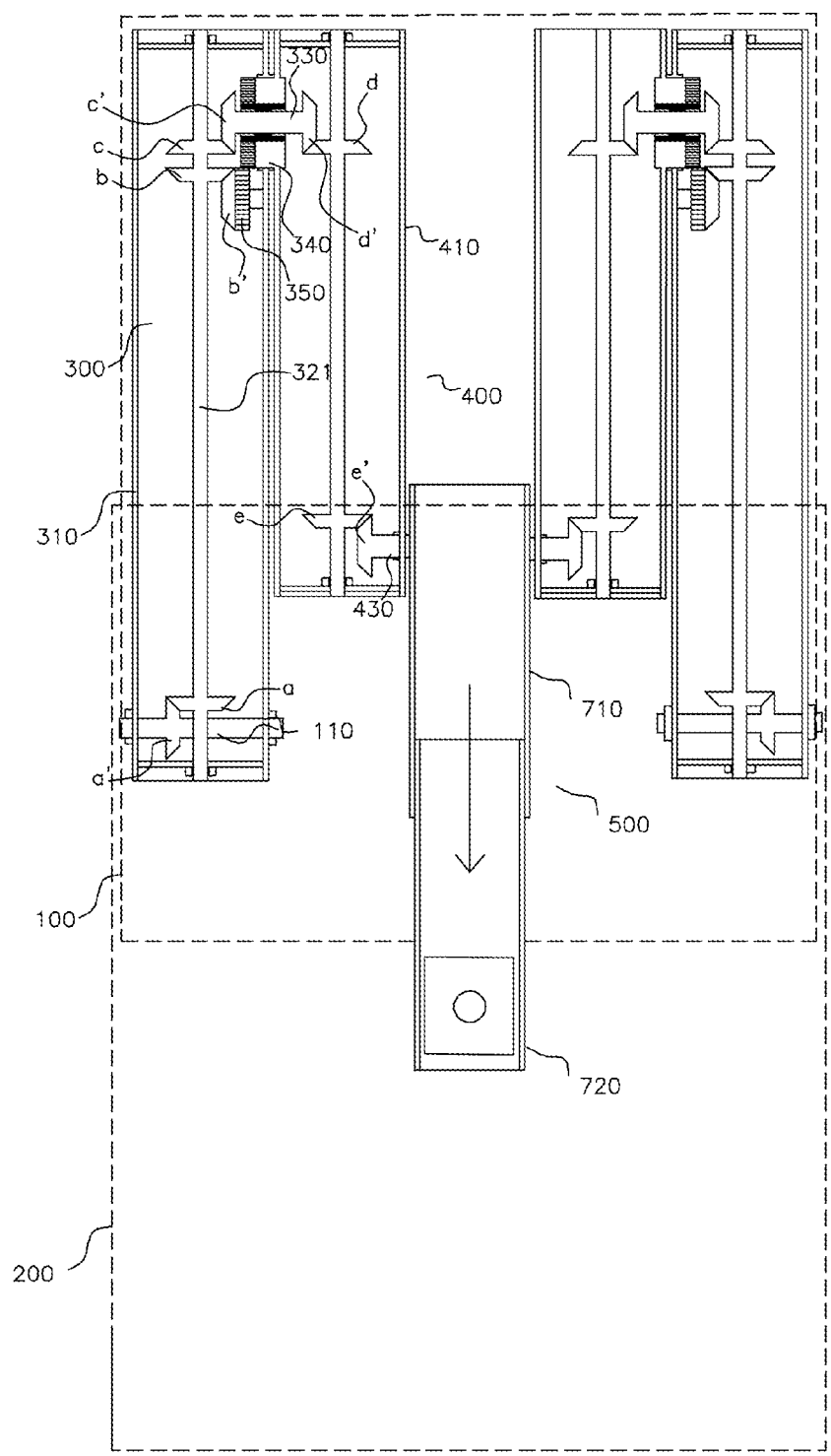
FIG. 3 is an operation view showing a horizontal movement state of an upper frame in FIG. 2.
Figure 4:
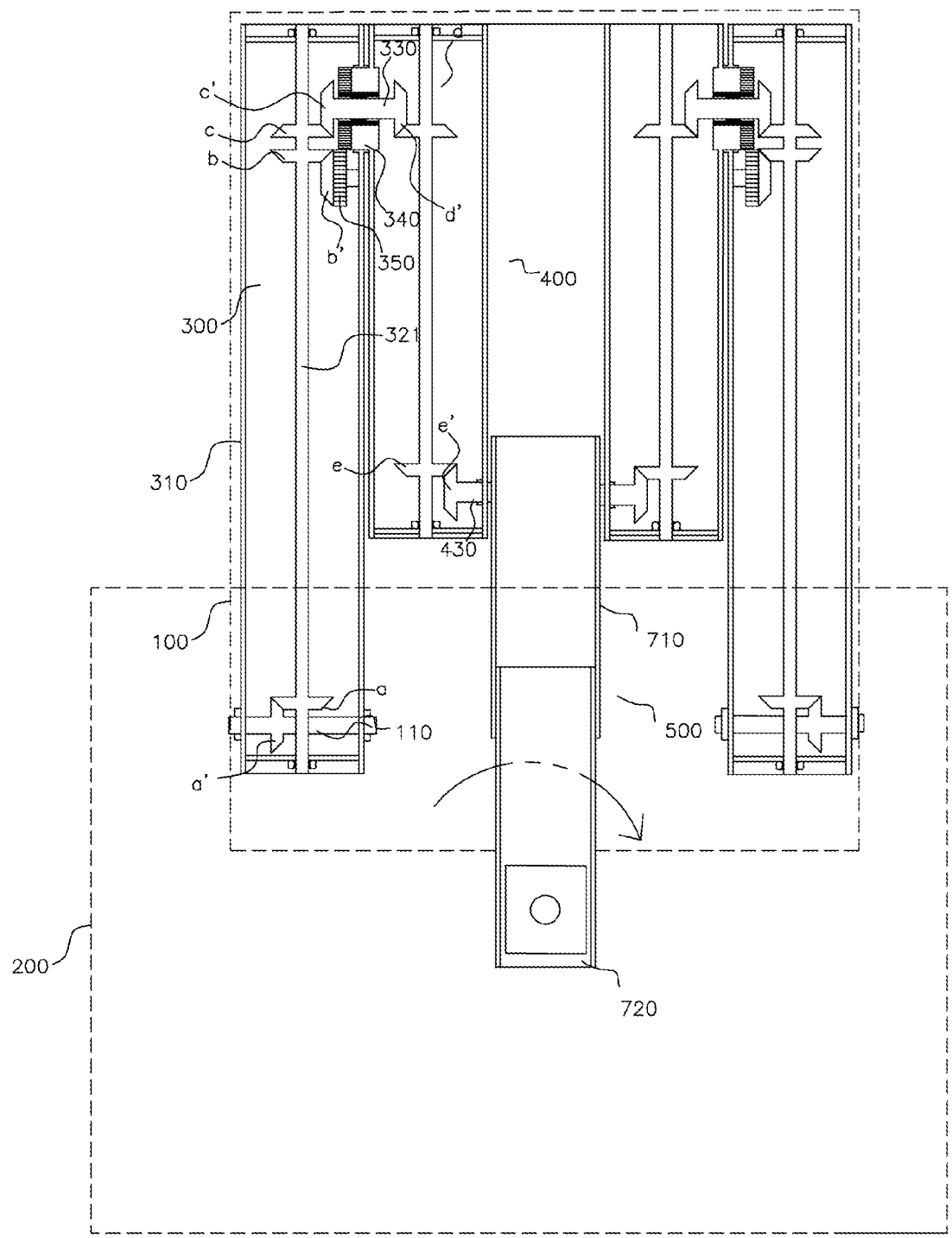
FIG. 4 is an operation view showing a horizontal rotation state of the upper frame in FIG. 3.

FIGS. 2 to 4 show an arrangement structure of the multi-lever in a state where the multi-lever is seated on the lower frame. A vertical lifting structure has not been shown, while the reason why the horizontal movement and the horizontal rotation are required has been visually described. In other words, according to the multi-lever lifting device of the present invention, the upper frame 200 may be horizontally moved to the rear side as shown in FIG. 3 in order to prevent an interference between the multi-lever and the upper frame 200, which occurs as the multi-lever is unfolded. In addition, the upper frame may be horizontally rotated by 90 degrees. In may be permissible to change an operation order of the horizontal movement and the horizontal rotation.

As shown in FIG. 2, while the multi-lever is disposed on the lower frame 100, the first lever 300 may rotate about the fixed shaft 110 by an external driving force. In this case, the fixed shaft 110 may be fixed to the lower frame 100 so as not to rotate. Preferably, the first lever 300 may be configured in a form of a first case in which a first power transmission device is mounted, and the second lever 400 may be configured in a form of a second case in which a second power transmission device is mounted. The first lever may rotate about the fixed shaft 110 to simultaneously rotate the first rotation shaft 330 and the outer rotation shaft 340 by the first power transmission device 320. Preferably, the first power transmission device 320 may include a first power transmission shaft 321 and bevel gears provided at both ends of the first power transmission shaft 321, respectively. An operation sequence of each of the levers will be described below.

When the first lever 300 rotates about the fixed shaft 110 by the external driving force, the first power transmission shaft 321 may be rotated by a bevel gear a engaged with a bevel gear a', and a bevel gear b and a bevel gear c may rotate so as to rotate a bevel gear b' and a bevel gear c', respectively. The bevel gear b' and the bevel gear c' may rotate the outer rotation shaft 340 and the first rotation shaft 330, respectively. The outer rotation shaft 340 may rotate the second lever 400 in an opposite direction to the first lever 300. Through the rotation of the first rotation shaft 330, a bevel gear d' and a bevel gear d may be engaged with each other so as to rotate, and a second power transmission shaft 421 may be rotated.

A bevel gear e and a bevel gear e' integrally coupled to each other may be rotated by the rotation of the second power transmission shaft 421, so that the third lever 500 integrally coupled to the bevel gear e' may rotate at a predetermined rate so as to maintain a horizontal state. The rotation operations of the first lever 300, the second lever 400, and the third lever 500 have been described with reference to FIG. 7.

Figure 5A:
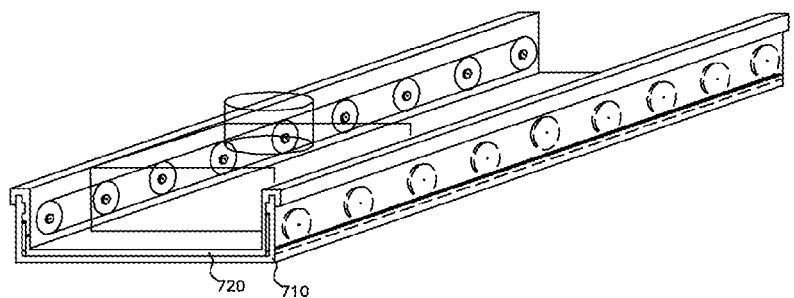
FIGS. 5A and 5B are perspective views showing one embodiment of a rail device for a horizontal movement in FIG. 2.
Figure 5B:
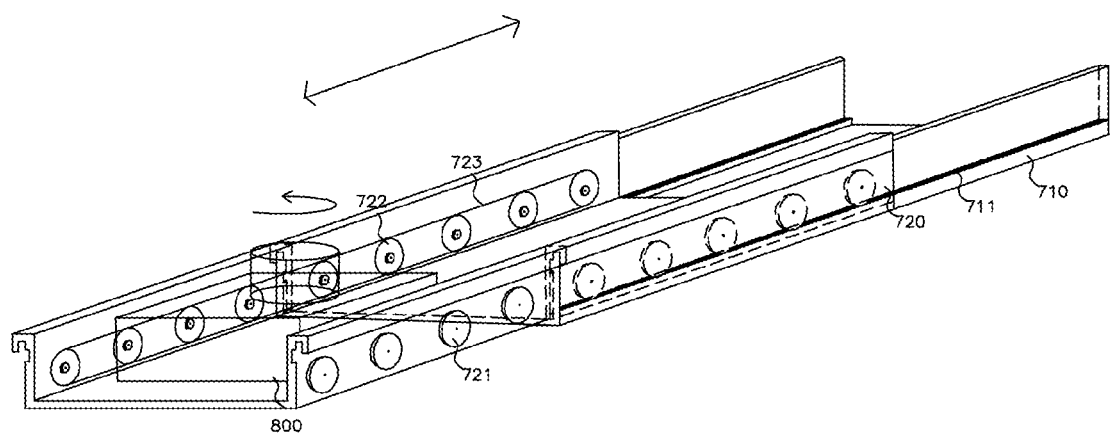

As shown in FIGS. 5A and 5B, a horizontal movement device 700 may include: a first rail 710 fixed so as not to be moved in a horizontal direction with respect to the third lever 500; and a second rail 720 configured to move in the horizontal direction with respect to the first rail 710. The second rail 720 may be configured to mutually and slidably move with respect to the first rail 710, the first rail 710 and the second rail 720 may include a rack 711 and a plurality of pinions 721, respectively, and the pinion 721 may be driven by an external driving force. FIGS. 5A and 5B show one embodiment, in which the rack is provided on the first rail 710 in a longitudinal direction, and the pinions 721 are provided on the second rail 720 to correspond to the rack 711. In order to drive the pinion 721 provided on the second rail 720, a sprocket 722 and a chain 723 for the driving may be provided on an opposite side of the pinion 721. However, shapes of the first rail 710 and the second rail 720 and arrangement and driving structures of the pinions 721 and the rack 711 may be configured in various forms through design changes without being limited to the embodiment of FIGS. 5A and 5B. In addition, a driving device for driving the pinion 721 may also be variously selected from a publicly known device in addition to the above embodiment.

Figure 6A:
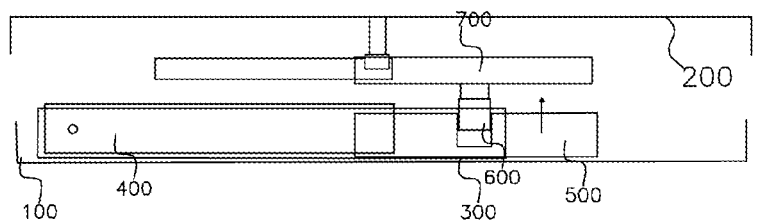
FIGS. 6A, 6B, 6C and 6D are side views showing an operation sequence of the upper frame according to FIGS. 2 and 3.
Figure 6B:
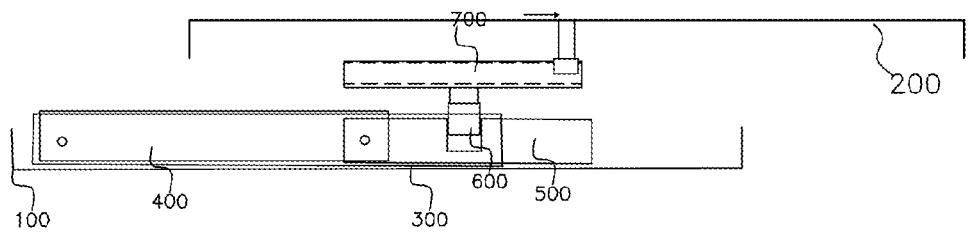
Figure 6C:
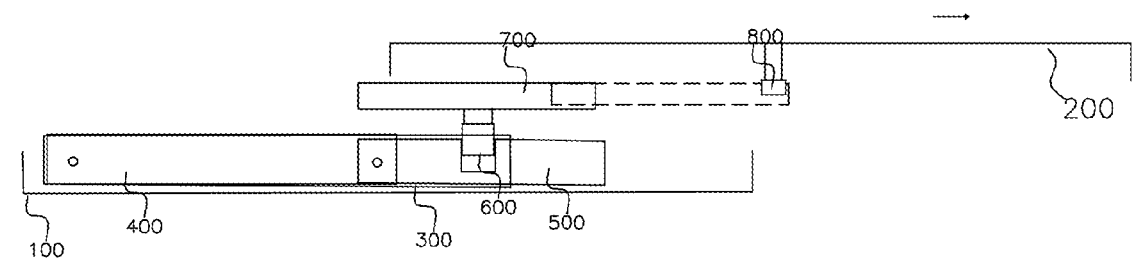
Figure 6D:
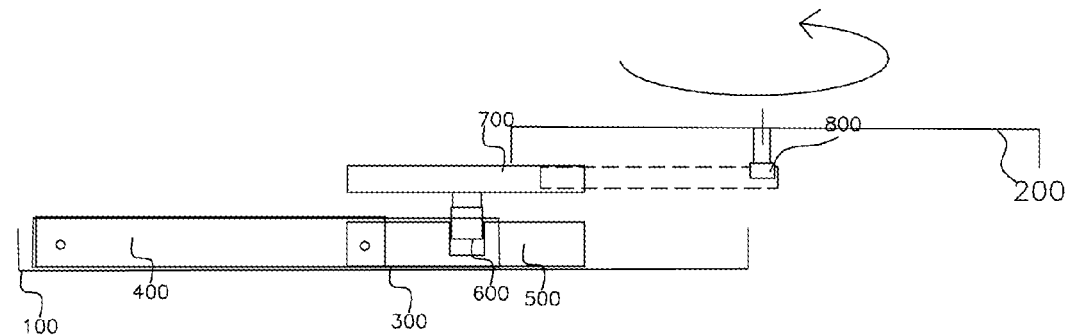

FIGS. 6A, 6B, 6C, and 6D show an operation sequence of the upper frame. In other words, as shown in FIG. 6A, the upper frame may be separated from the lower frame by a lifting/lowering device 600. The lifting/lowering device 600 may have a telescopic structure or a widely known structure using a transfer screw and a transfer nut. This may be selected from publicly known devices. However, this process performed by the lifting/lowering device may be omitted if necessary. FIG. 6B shows an intermediate state in which the second rail 720 fixed to the upper frame 200 horizontally moves in the longitudinal direction of the first rail 710 so as to horizontally move to the rear side. FIG. 6C shows a state in which the horizontal movement of the second rail 720 fixed to the upper frame 200 along the first rail 710 is completed, and FIG. 6D shows a horizontal rotation device 800 provided on the second rail 720 so as to horizontally rotate the upper frame 200 with respect to the second rail 720 by 90 degrees. A fixing device capable of loading a cargo may be provided on a top surface of the upper frame 200, and a cargo having a long length may be easily fixed by the horizontal rotation of the upper frame 200.

Figure 7:
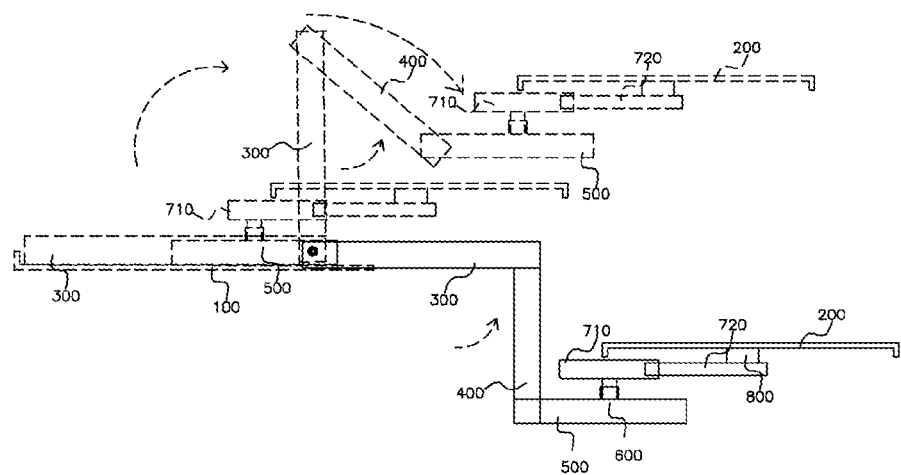
FIG. 7 is a view showing an operation sequence of the multi-lever after an operation according to FIG. 6.

FIG. 7 shows an operation posture of the multi-lever lifting device according to the present invention while the multi-lever lifting device is fixed to the vehicle, in which a process of horizontally moving the upper frame 200 to the rear side with respect to the third lever 500 first, horizontally rotating the upper frame 200, and unfolding the multi-lever is shown.

Preferably, while the first lever 300 is rotated upward by 90 degrees, the second lever 400 may rotate in the opposite direction so as to be unfolded downward by 45 degrees. In addition, the third lever 500 may rotate with respect to the second lever 400 while always maintaining the horizontal state.

When the first lever 300 is finally in the horizontal state toward the rear side, the second lever 400 may be in a vertical state toward a lower side, the third lever 500 may be maintained in the horizontal state, and the upper frame 200 may be placed on the ground position, which is a position in which a cargo may be loaded and unloaded. A user may load the cargo at the ground position, and move the cargo to the loading position of the vehicle through an opposite process.

What is claimed is:

1. A multi-lever lifting device for a vehicle with improved efficiency, the multi-lever lifting device comprising:
    a lower frame (100) fixed to a roof of the vehicle, and provided at a rear end thereof with a fixed shaft (110);
    an upper frame (200) having a size corresponding to the lower frame, and provided to cover the lower frame at a roof position;
    a multi-lever folded at the roof position and deployed at a loading/unloading position, and including
        a first lever (300) provided between the lower frame (100) and the upper frame (200), seated on the lower frame (100), and configured to rotate about the fixed shaft (110),
        a second lever (400) having a rear end hinge-coupled to a front end of the first lever (300) by a first rotation shaft (330), and seated on the lower frame (100) in an opposite direction to the first lever, and
        a third lever (500) having a rear end hinge-coupled to a front end of the second lever (400) by a second rotation shaft (430), having a front end provided with the upper frame, and seated on the lower frame (100);
    an outer rotation shaft (340) having a concentric shape, and configured to rotate independently about the first rotation shaft (330),
    wherein the outer rotation shaft (340) is integrally coupled to the second lever so as to rotate,
    a first power transmission device (320) for connecting the fixed shaft (110) to the first rotation shaft (330) and connecting the fixed shaft (110) to the outer rotation shaft (340) is provided,
    a second power transmission device (420) is provided between the first rotation shaft (330) and the second rotation shaft (430), and
    the second rotation shaft is integrally coupled to the third lever so as to rotate.

2. The multi-lever lifting device of claim 1, wherein the second lever (400) is configured to rotate in an opposite direction to a rotation direction of the first lever (300), and
    the third lever (500) is configured to rotate in a same direction as the second lever (400) with respect to the second lever (400) about the second rotation shaft (430) so as to maintain a horizontal state.

3. The multi-lever lifting device of claim 2, further comprising:
    a lifting/lowering device (600) for vertically moving the upper frame (200) upward with respect to the third lever (500).

4. The multi-lever lifting device of claim 2, further comprising:
    a horizontal movement device (700) for horizontally moving the upper frame (200) in a horizontal direction with respect to the third lever (500); and
    a horizontal rotation device (800) for horizontally rotating the upper frame (200) with respect to the third lever (500).

5. The multi-lever lifting device of claim 3, further comprising:
    a horizontal movement device (700) for horizontally moving the upper frame (200) in a horizontal direction with respect to the third lever (500); and
    a horizontal rotation device (800) for horizontally rotating the upper frame (200) with respect to the third lever (500).

6. The multi-lever lifting device of claim 4, wherein the horizontal movement device (700) includes:
- a first rail (710) having a position fixed with respect to the third lever (500); and
- a second rail (720) provided to move forward and rearward with respect to the first rail (710),
- the first rail (710) and the second rail (720) are gear-coupled to each other by a rack (711) and a pinion (721), and
- the pinion (721) is controlled by an external driving force.

7. The multi-lever lifting device of claim 5, wherein the horizontal movement device (700) includes:
- a first rail (710) having a position fixed with respect to the third lever (500); and
- a second rail (720) provided to move forward and rearward with respect to the first rail (710),
- the first rail (710) and the second rail (720) are gear-coupled to each other by a rack (711) and a pinion (721), and
- the pinion (721) is controlled by an external driving force.

\* \* \* \* \*